United States Patent [19]

Cataldo

[11] 4,157,106
[45] Jun. 5, 1979

[54] RUN-FLAT TIRE HAVING INTERNAL SUPPORT MEANS

[75] Inventor: Roy S. Cataldo, Birmingham, Mich.

[73] Assignee: General Motors Corporation, Detroit, Mich.

[21] Appl. No.: 851,843

[22] Filed: Nov. 16, 1977

[51] Int. Cl.² .................. B60C 17/00; B60C 17/04
[52] U.S. Cl. ......................... 152/158; 152/330 RF
[58] Field of Search ............ 152/158, 330 RF, 330 L, 152/353 R, 400, 399, 352

[56] References Cited

U.S. PATENT DOCUMENTS

| | | | |
|---|---|---|---|
| 1,215,577 | 2/1917 | Reeder | 152/158 |
| 3,420,288 | 1/1969 | Unruh | 152/158 |
| 3,509,928 | 5/1970 | Aghnides | 152/158 |
| 3,935,892 | 2/1976 | Arimura et al. | 152/158 |

Primary Examiner—Francis S. Husar
Assistant Examiner—Lawrence E. Williams
Attorney, Agent, or Firm—John P. Moran

[57] ABSTRACT

The drawings disclose a pneumatic tubeless tire including a self seating stabilizer formed of a plurality of segments, each having a centrally located flange formed on the inner surface thereof. A fastener ring is secured to the segmented flanges during assembly for retaining the segments as a unit between the inner surfaces of the usual two sidewalls radially intermediate the widest portion thereof and the beaded ends thereof. The segments may be formed of any suitable material, such as thermoplastic material containing glass fiber reinforcement or aluminum. The annular stabilizer unit provides lateral and radial support for the tire sidewalls, particularly when the tire becomes deflated.

3 Claims, 6 Drawing Figures

RUN-FLAT TIRE HAVING INTERNAL SUPPORT MEANS

This invention relates generally to pneumatic tires and, more particularly, to pneumatic tires having internal "run-flat" features.

Heretofore, various structures have been suggested for use inside a pneumatic tire to support the weight of the vehicle in the event of a deflated tire.

An object of this invention is to provide improved stabilizer means for use in pneumatic tires for rotatably supporting a vehicle in the event of a "flat tire" condition.

Another object of the invention is to provide an improved segmented tire stabilizer for mounting inside a tire and adapted to being seated against the sidewalls thereof radially intermediate the beaded ends and the widest portion of the tire, for providing lateral and radial support for the tire sidewalls should the tire become deflated.

A further object of the invention is to provide a pneumatic tubeless tire including the usual outer tread surface, oppositely disposed sidewalls, and a bead adjacent each inner sidewall end, and, in cooperation therewith, a self-seating stabilizer formed of a plurality of segments, each having a radially inwardly directed flange formed along the length of the inner surface thereof, a fastener ring secured to the segmented flanges during assembly for retaining the segments as a unit adapted to seat against oppositely disposed inner surfaces of the usual two sidewalls for providing lateral and radial support for the tire sidewalls, particularly when the tire becomes deflated.

These and other objects and advantages will become more apparent when reference is made to the following description and accompanying drawings, wherein:

FIG. 1 is a fragmentary cross-sectional view of a wheel and pneumatic tire arrangement embodying the invention;

FIGS. 2 and 3 are fragmentary cross-sectional views taken along the planes 2—2 and 3—3, respectively, of FIG. 1, and looking in the direction of the arrows;

Figure 1:
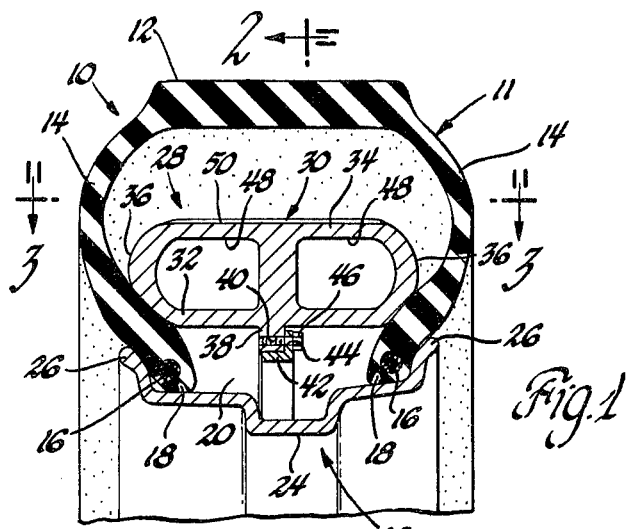
Figure 2:
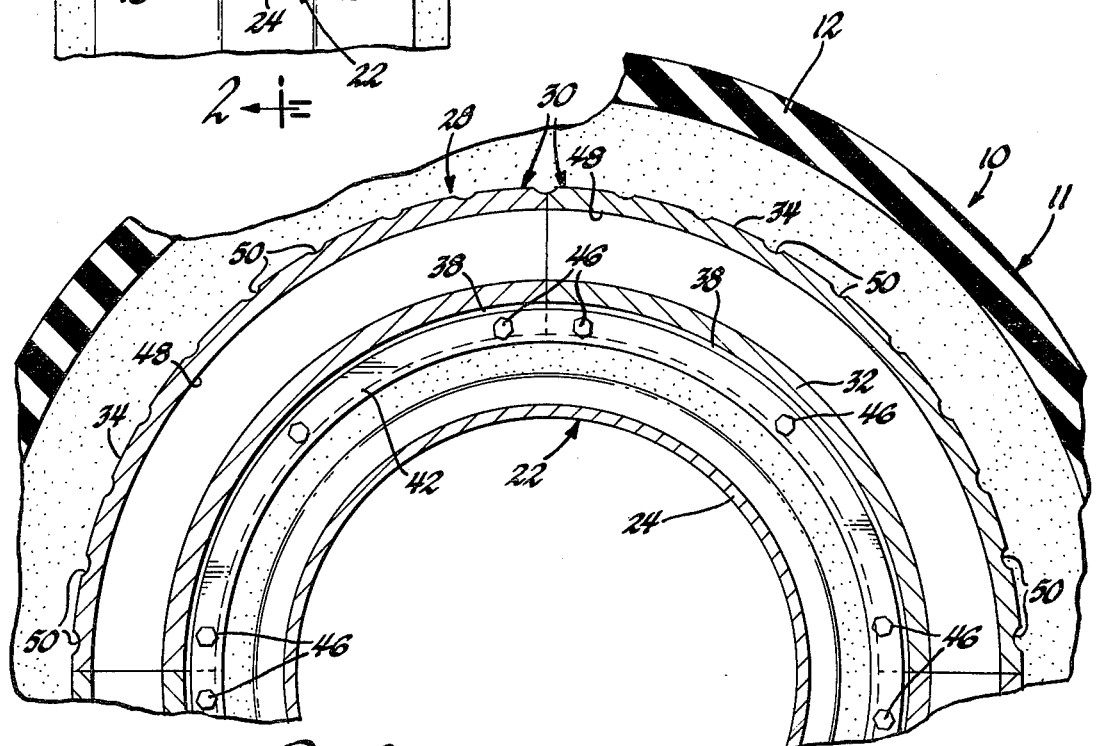
Figure 3:
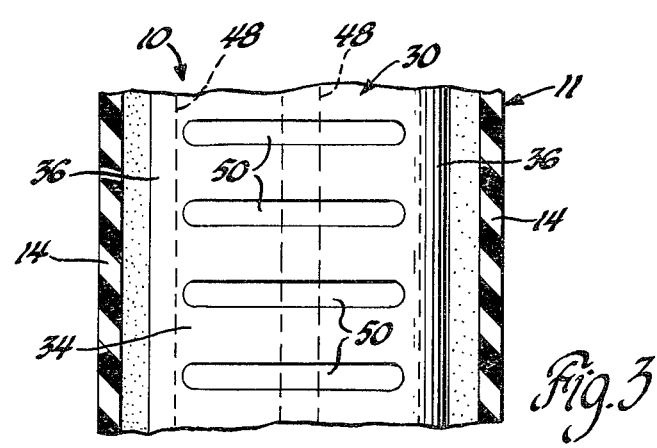

Referring now to the drawings in greater detail, FIGS. 1-3 illustrate a pneumatic, tubeless, "run-flat" tire assembly 10 including a carcass 11 having an outer tread surface 12, oppositely disposed sidewalls 14, a bead 16 adjacent each inner sidewall end portion 18, and an annular opening 20 between the beaded ends, for mounting on a vehicle wheel 22 having a rim 24 including rim flanges 26 formed on oppositely disposed sides thereof for retaining the beaded ends 16, 18 in sealing engagement therewith when the tire is inflated.

A stabilizer assembly 28 is mounted inside the tire carcass 11 so as to seat against the sidewalls 14 at a location radially outwardly of the beaded end 16/18, confining the tire sidewall solididly between oppositely disposed peripheral portions of the assembly 28 and the outer end portions of the rim flanges 26.

The stabilizer assembly 28 is formed of a plurality of arcuate segments 30, say, four, which abut together to form a full round unit. Each segment 30 includes inner and outer support walls 32 and 34, respectively, having widths larger than the mounted width of the annular opening 20, and external toroidal shaped sidewalls 36 interconnecting the inner and outer support walls for seating on the oppositely disposed inner surfaces of the sidewalls a predetermined distance radially outwardly of the beaded ends 16/18.

A flange 38 is formed along the length of the inner arcuate surface of each segment 30. A plurality of spaced threaded holes 40 are formed in a side surface of each flange 38. A fastener ring 42 having an "L" shaped cross section is mounted against the side and inner surface of the flanges 38. A plurality of openings 44 are formed through the ring 42, aligned with the threaded holes 40 for threadedly securing the ring 42 to the flanges 38 by bolts 46 to form the complete stabilizer assembly 10.

As may be noted in FIGS. 1 and 2, the segments 30 are formed to include juxtapositioned arcuate openings 48, and, as shown in FIG. 3, a plurality of spaced transverse slots 50 are formed in the radially outermost wall of each segment 30, in order to reduce the weight of the assembly 10.

Figure 4:
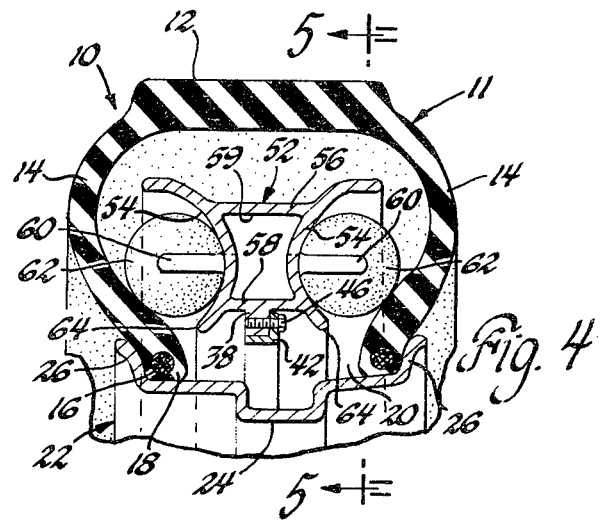
FIG. 4 is a fragmentary cross-sectional view of a wheel and pneumatic tire arrangement showing an alternate embodiment of the invention.
Figure 5:
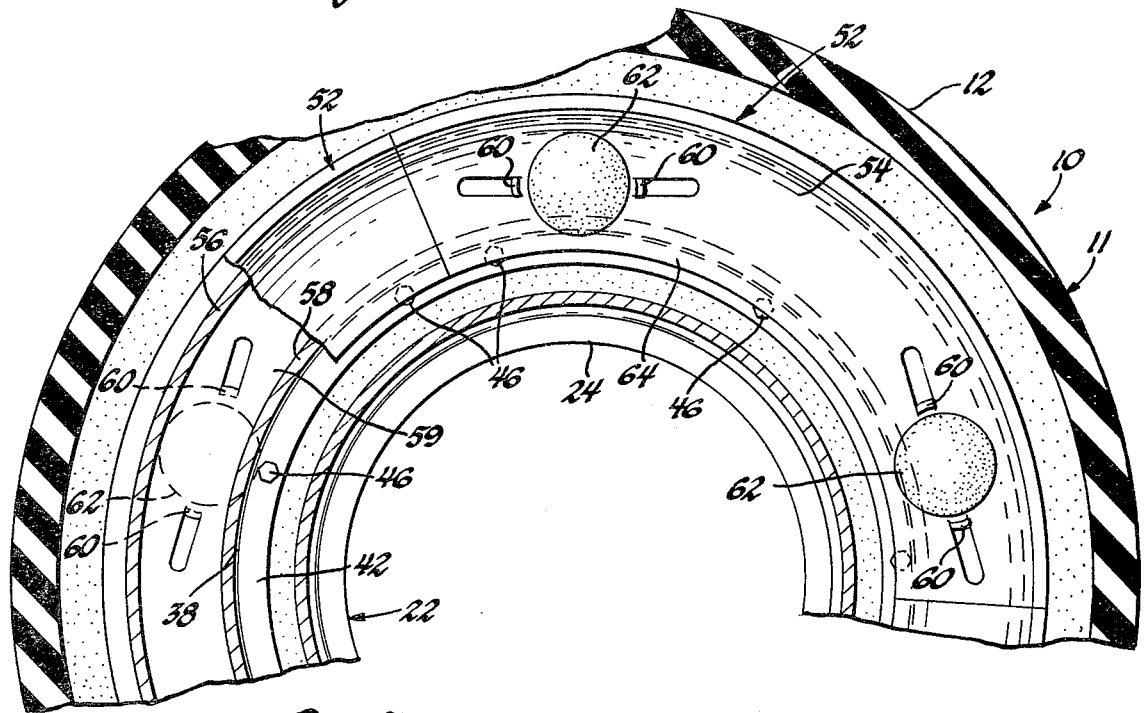
FIG. 5 is an enlarged fragmentary cross-sectional view taken along the plane 5—5 of FIG. 4, and looking in the direction of the arrows.
Figure 6:
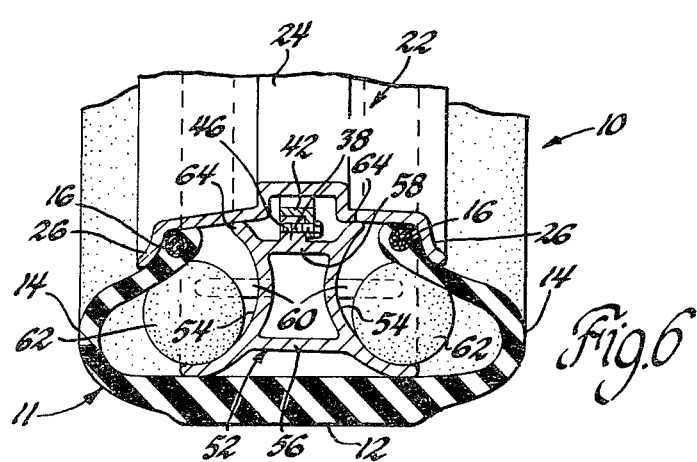
FIG. 6 is a view showing the FIG. 4 structure in a different operational position.

FIGS. 4-6 illustrate an alternate embodiment of the invention wherein arcuate segments 52 are formed to include oppositely disposed, internal toroidal shaped sidewalls 54 formed on outer and inner support walls 56 and 58, respectively, forming an arcuate cavity 59 therebetween. Pairs of circumferentially spaced retainer members 60 are formed at predetermined locations around each sidewall 54 in any suitable manner, such as by punching same out of the walls 54 in an axial direction. A ball 62 is mounted between each pair of retainer members 60 (FIG. 5) for rolling confinement after assembly between a toroidal wall 54 and the inner surface of the adjacent tire sidewall 14 (FIG. 4) in substantially the same location as the external toroidal shaped sidewalls 36 of the segments 30 of the FIG. 1 structure.

During assembly, the balls 62 are preferably temporarily retained in place against the respective walls 54 by any suitable adhesive.

As with the FIG. 1 assembly 28, radially inwardly directed arcuate flanges 38 are formed on the inner surfaces of the inner walls 56 of the segments 52 for cooperation with the fastener ring 42.

FIG. 6 illustrates that, for a deflated tire, the balls 62 roll to the outermost portion of the toroidal sidewalls 54, as the ring of assembled segments 52 is forced radially inwardly until the inner edges 64 of the toroidal shaped walls 54 at the bottom abut against the rim 24 to support the vehicle.

It is apparent that the invention provides improved means mountable in a tire for effectively and efficiently supporting the continued movement of a vehicle should a tire containing such means become deflated.

While but two embodiments of the invention have been shown and described, other modifications thereof are possible.

The embodiments of the invention in which an exclusive property or privilege is claimed are defined as follows:

1. For use within a pneumatic tire including a carcass having an outer tread surface, oppositely disposed sidewalls, a bead adjacent each inner sidewall end, and an annular opening between the beaded ends, on a vehicle wheel having an annular rim and annular rim flanges formed on oppositely disposed sides thereof for retaining said beaded ends of said tire in sealing engagement therewith when said tire is inflated; a tire stabilizer comprising a plurality of arcuate segments, each segment including inner and outer support walls, toroidal-shaped sidewalls interconnecting said inner and outer support walls, means on said toroidal-shaped sidewalls for seating on the oppositely disposed inner surfaces of said tire sidewalls a predetermined distance radially outwardly of said beaded ends, and a radially extending assembly flange formed on the inner surface of said inner support wall; a unitizing ring spaced radially from supportive engagement with said rim and abutted against one side of each of said assembly flanges; and fastener means for securing said unitizing ring to each of said assembly flanges so that said ring is entirely supported by said stabilizer and for retaining said means in place against said oppositely disposed inner surfaces of said tire sidewalls with respect to said rim flanges and the portions of said tire walls confined between said rim flanges and said means when said tire becomes deflated.

2. For use within a pneumatic tire including a carcass having an outer tread surface, oppositely disposed sidewalls, a bead adjacent each inner sidewall end, and an annular opening between the beaded ends, on a vehicle wheel having an annular rim and rim flanges formed on oppositely disposed sides thereof for retaining said beaded ends of said tire in sealing engagement therewith when said tire is inflated; a tire stabilizer comprising a plurality of arcuate segments, each segment including inner and outer support walls having widths larger than the mounted width of said annular opening, toroidal-shaped sidewalls interconnecting said inner and outer support walls for seating on the oppositely disposed inner surfaces of said tire sidewalls a predetermined distance radially outwardly of said beaded ends, and a radially extending assembly flange formed on the inner surface of said inner support wall; a unitizing ring spaced radially from supportive engagement with said rim and abutted against one side of each of said assembly flanges; and fastener means for securing said unitizing ring to each of said assembly flanges so that said ring is entirely supported by said stabilizer and for retaining said arcuate segments in place against said oppositely disposed inner surfaces of said tire sidewalls with respect to said rim flanges and the portions of said tire walls confined between said rim flanges and said toroidal-shaped sidewalls when said tire becomes deflated.

3. For use within a pneumatic tire including a carcass having an outer tread surface, oppositely disposed sidewalls, a bead adjacent each inner sidewall end, and an annular opening between the beaded ends, on a vehicle wheel having rim flanges formed on oppositely disposed sides thereof for retaining said beaded ends of said tire in sealing engagement therewith when said tire is inflated; a tire stabilizer comprising a plurality of arcuate segments, each segment including inner and outer support walls, toroidal-shaped sidewalls interconnecting said inner and outer support walls, a plurality of pairs of circumferentially spaced retainer members formed on each of said toroidal-shaped sidewalls, a ball mounted between each pair of retainer members for seating on the oppositely disposed inner surfaces of said tire sidewalls a predetermined distance radially outwardly of said beaded ends, and a radially extending assembly flange formed on the inner surface of said inner support wall; a unitizing ring abutted against one side of each of said assembly flanges; and fastener means for securing said unitizing ring to each of said assembly flanges and retaining said balls in rolling contact with said toroidal-shaped sidewalls and in place against said oppositely disposed inner surfaces of said tire sidewalls with respect to said rim flanges and the portions of said tire walls confined between said rim flanges and said balls when said tire becomes deflated.

* * * * *